United States Patent [19]

Hard

[11] 4,254,881
[45] Mar. 10, 1981

[54] OVERHEAD KITCHEN UTENSIL RACK

[76] Inventor: Alfred B. Hard, 701 North Way, North Bend, Oreg. 97459

[21] Appl. No.: 87,872

[22] Filed: Oct. 24, 1979

[51] Int. Cl.³ .............................................. A47F 7/00
[52] U.S. Cl. ..................................... 211/71; 211/41; 211/113
[58] Field of Search .................... 211/113, 118, 71, 41, 211/184, 43; 108/61

[56] References Cited

U.S. PATENT DOCUMENTS

| 465,070 | 12/1891 | Trew | 211/41 X |
|---|---|---|---|
| 878,315 | 2/1908 | Sanso | 211/41 |
| 1,989,841 | 2/1935 | Ball | 211/41 X |
| 2,433,823 | 12/1947 | Lindeblad | 211/71 X |
| 2,953,258 | 9/1960 | Streit | 211/184 |
| 2,969,154 | 1/1961 | Pelletier | 211/71 |
| 2,971,652 | 2/1961 | Getchell et al. | 211/41 |
| 3,241,683 | 3/1966 | Blodee | 211/184 X |

FOREIGN PATENT DOCUMENTS

| 2293894 | 12/1974 | France | 211/71 |
|---|---|---|---|
| 444805 | 2/1968 | Switzerland | 211/113 |
| 377415 | 7/1932 | United Kingdom | 211/41 |

Primary Examiner—Roy D. Frazier
Assistant Examiner—Robert W. Gibson, Jr.
Attorney, Agent, or Firm—James D. Givnan, Jr.

[57] ABSTRACT

An overhead rack for the storage of kitchen utensils the utensils being supported on edge in a space conserving manner. The rack is of open frame construction with inner and outer members on which the utensils rest. Adjustably mounted along the frame members are utensil supporting members positionable to accept utensils of various depths and to support same in an upright manner. The utensil supporting members are flexible and shaped at their ends to engage frame members in a manner to resist tipping by a utensil. The support members are also shaped at their ends to facilitate proper positioning on the frame members. The support members are normally in expanded biased engagement with opposed frame members.

5 Claims, 4 Drawing Figures

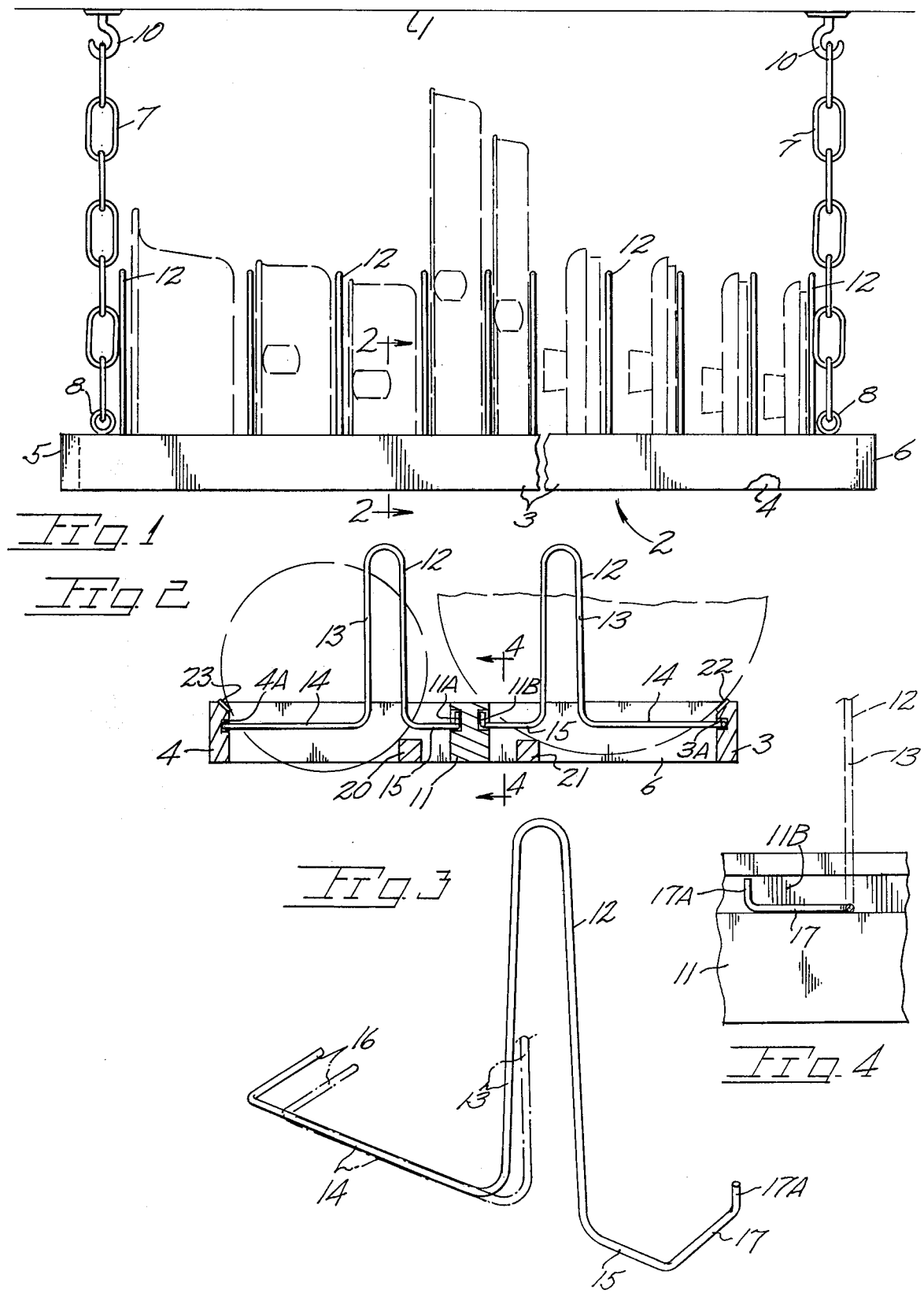

OVERHEAD KITCHEN UTENSIL RACK

BACKGROUND OF THE INVENTION

The present invention relates generally to utensil storage racks and particularly to a storage rack suspended from a kitchen ceiling.

Typically, a wide assortment of pots and pans and the lids for same are kept in a lower kitchen storage cabinet in a nested manner. Such are somewhat inaccessible necessitating selection and retrieval in an inconvenient manner. Such storage cabinets typically provide no means for the orderly positioning of cooking utensils rendering the selection of a pan and its cover a bothersome task. Further, the usual storage cabinet is not illuminated further complicating the task at hand.

SUMMARY OF THE PRESENT INVENTION

The present invention is embodied within an overhead storage rack suspended from the ceiling and positioned so as to provide high visibility and full access to the user. The present rack comprises an open frame having frame members which serve to jointly support an assortment of pots and pans, along with covers for same. Adjustably mounted on said frame members is a multitude of flexible support members which serve to retain an adjacent utensil in an upright manner. These support members may be of shaped wire construction configured at their ends for tiased retentive engagement with the frame members above mentioned in a manner assuring upright positioning of the support member regardless of a utensil leaning thereagainst. Said support members being of wire are yieldable to enable momentary disengagement from frame members for purposes of support member re-positioning. The inherent resiliency of the support members assures positive engagement with the frame members at all other times. Additional lengthwise extending auxiliary frame members are provided within the rack frame for the support of smaller pans and covers. If so desired, a curtain frame may be disposed about the rack to conceal the rack supported items from view while permitting same to be viewed by the user standing therebelow.

Important objects of the present invention include the provision of a rack upon which kitchen utensils may be stored in an otherwise unused space; the provision of a rack for suspension from a ceiling which provides a full view of the available utensils to someone standing therebelow to facilitate selection, retrieval and return of the desired utensil; the provision of an overhead storage rack permitting limited cabinet space to be otherwise utilized; the provision of a rack on which a collection of attractive kitchen utensils may be displayed contributing to the appearance of the kitchen.

BRIEF DESCRIPTION OF THE DRAWING

In the accompanying drawing:

FIG. 1 is a side elevational view of the present utensil rack suspended from a ceiling;

FIG. 2 is a vertical sectional view taken along line 2—2 of FIG. 1;

FIG. 3 is an enlarged perspective view of a support member disassociated from the rack frame; and FIG. 4 is a vertical sectional view taken along line 4—4 of FIG. 2 showing end segment configuration of a support member.

DETAILED DESCRIPTION OF THE PREFERRED EMBODIMENT

With continuing attention to the drawing wherein reference numerals indicate parts similarly hereinafter identified, the reference numeral 1 indicates the ceiling of a room which, in the present instance, would most likely be the kitchen. Indicated generally at 2 is the rack frame comprised of outer members 3 and 4 extending the length of the frame and interconnected at their ends by cross members 5 and 6. Rack suspension members at 7 may be in the form of decorative lengths of chain each secured at its lower end to the rack frame by suitable means such as eyebolts 8. For convenient suspension from the ceiling, hooks at 10 may be utilized which hooks are preferably of the expansible type so as to support a moderate load without damage to the ceiling structure.

With attention to the transverse section of the rack frame shown in FIG. 2, an inner, lengthwise extending rack member is shown at 11 in securement at its ends with rack cross members 5 and 6. Inner member 11 defines a pair of lengthwise extending channels at 11A and 11B, outer members 3 and 4 of the frame define channels at 3A and 4A.

Support members at 12 are provided for the purpose of retaining each of the rack supported utensils in closely spaced, upright relationship to one another to enable full utilization of rack space and, accordingly, retain the maximum number of utensils. Said support members are shown as being of shaped wire construction each having an upright segment 13 terminating downwardly in horizontal segments at 14 and 15 which, in turn, have angulated end segments at 16 and 17 for disposition within the frame member channels. End segments 16 and 17 are shaped so as to engage their respective channels in a manner preventing tipping of upright segment 13 in response to a utensil rested thereagainst. Further, end segment 17 has an upturned terminus at 17A to assure correct orientation of the support member to the frame members. For example, with attention to FIG. 2, it will be seen that the upturned end 17A will only fit within channels 11A or 11B by reason of same being of greater section than channels 3A-4A thereby assuring upright segment 13 of the support member being offset toward adjacent inner frame member 11. Such permits larger pans and covers to at all times rest in full engagement with an outer member 3 or 4 and inner member 11. Were upright segment 13 centrally disposed the cover knob could prematurely lodge thereagainst preventing full frame member resting engagement. The pans and lids may be stored individually as shown in FIG. 1 or the support members may be spaced somewhat further apart than shown to permit a combined pan and its lid to be stored as a unit.

Auxiliary innter frame members are shown at 20 and 21 which are offset from inner member 11 for the purpose of supporting, jointly with outer members 3 and 4, smaller sized covers and pans per the smaller utensil shown in phantom lines in FIG. 2. Accordingly, a single rack may support a full range of kitchen utensils from the smallest saucepan on the right to the largest frying pan.

Outer frame members 3 and 4 may each be provided with a superimposed resilient strip at 22 and 23 to prevent utensil rotation by reason of an offset utensil handle thereby assuring uniform handle disposition for appearance sake.

If desired, the rack and utensils thereon may be partially concealed by an enclosure such as a curtain which is spaced outwardly from the rack so as to not interfere with the outwardly projecting utensil handles. Such a curtain may be desirable from an esthetic standpoint and additionally from the aspect of preventing airborne particles from collecting on utensil surfaces. The curtain may be supported by independent structure.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A rack for reception of kitchen utensils and storage of same in an overhead manner, said rack comprising,
   a frame including an inner frame member and outer frame members,
   means for suspending said frame from a ceiling, and
   utensil support members carried by said inner and outer frame members and each utensil support member having an upright segment for juxtaposed disposition with a utensil to retain the utensil in rested engagement on said frame members in an upright position,
   said support members further having at least one angulated end segment for engagement with a frame member to assure proper orientation of the support member to said frame members with the upright segment of the support member at all times supported in place by said angulated segment against tipping by a utensil.

2. The rack claimed in claim 1 additionally including at least one auxiliary inner frame member offset from and proximate said inner frame member to support smaller diameter utensils, said auxiliary inner frame member disposed below said utensil support members.

3. The rack claimed in claim 1 wherein each of said support members includes horizontal segments extending oppositely from said upright segment, said oppositely extending horizontal segments being of unequal length so as to offset said upright segment toward said inner frame member so as to avoid undesired contact with a utensil in place on the inner and an outer frame member.

4. The rack claimed in claim 1 wherein said inner and outer frame members each define a lengthwise extending channel for reception of an angulated end segment of a support member.

5. The rack claimed in claim 4 wherein some of said channels are of unequal crossection, said one angulated end segment having an upturned terminus of a height to be received only within a channel of larger crossection to assure desired support member to frame orientation.

* * * * *